UNITED STATES PATENT OFFICE.

LA ROY F. GRIFFIN, OF NEW LONDON, NEW HAMPSHIRE.

ARTIFICIAL BUILDING-BLOCK.

SPECIFICATION forming part of Letters Patent No. 547,950, dated October 15, 1895.

Application filed December 31, 1894. Serial No. 533,488. (No specimens.)

*To all whom it may concern:*

Be it known that I, LA ROY F. GRIFFIN, a citizen of the United States, residing in the town of New London, in the county of Merrimac and State of New Hampshire, have invented a new and useful Artificial Building-Block; and I do hereby declare that the following is a full, clear, and exact description of the invention.

My invention aims to unite waste slate and other waste stone, after grinding or otherwise reducing to sufficiently small masses, into blocks, slabs, or ornamental pieces of any form desired, so as to be used for purposes of construction that have hitherto demanded other materials, thus rendering these comparatively useless materials of value.

In preparing my artificial building-block I use the new substance produced by treating about one hundred pounds of waste sulphite liquor (made in the process of making wood pulp by the so-called "sulphite process" and containing nearly or quite all the ingredients of the wood in solution except cellulose) with about fourteen pounds of glue, heating until dissolved, and allowing the product to stand until all resulting changes are complete. I next mix together about one hundred parts of pulverized slate or other stone and about ten parts of the material prepared above, adding just sufficient water to moisten the whole and to make the mixture sufficiently intimate. The mixture is then molded into any forms desired and pressed with a pressure that is sufficient to bring the particles of stone into practical contact. The blocks so formed are then allowed to dry and harden by exposure to the air. Two sets of chemical changes appear to take place—a direct union of the new substance with some ingredient or ingredients of the stone and a hardening of the product through absorption of some substance or substances from the air. The final result is a block possessing approximately the strength of the original slate or other stone used with its other properties except cleavage.

When the blocks are to be used in situations exposed to the weather, after they are dried and partly hardened I dip them in boiled linseed-oil. This acts partly to fill any pores in the block and partly by union with the stone itself it forms a layer on the outside which is unaffected by moisture. The block so treated weathers very slowly or not at all.

Having thus described my invention, I claim as new and desire to protect by Letters Patent—

1. The method of manufacturing artificial building blocks, which consists in first mixing sulphite liquor and glue, then heating the mixture to cause dissolution, then adding a pulverized mineral substance, then moistening the mixture and molding it under slight pressure, and finally releasing the pressure and allowing the ingredients of the block to undergo mutual chemical action and thereby produce a hardened mass.

2. The method of manufacturing artificial building blocks, which consists in first mixing sulphite liquor and glue, then heating the mixture to cause dissolution, then adding a pulverized mineral substance, then moistening the mixture and molding it under slight pressure, then partially drying the blocks, then treating them with linseed oil, and finally allowing them to become entirely dry.

3. An artificial building block comprising a pulverized mineral, sulphite liquor and glue, solidified and having a surface coating of linseed oil.

4. An artificial building block, comprising ten parts of a compound consisting of one-hundred parts of sulphite liquor and fourteen parts of glue; one-hundred parts of a pulverized mineral; sufficient water to moisten the mass; and a surface coating of linseed oil.

LA ROY F. GRIFFIN. [L. S.]

Witnesses:
NATHAN L. GRIFFIN,
LILIAN F. GRIFFIN.